United States Patent
Seo et al.

(10) Patent No.: US 11,465,287 B2
(45) Date of Patent: Oct. 11, 2022

(54) ROBOT, METHOD OF OPERATING SAME, AND ROBOT SYSTEM INCLUDING SAME

(71) Applicant: LG ELECTRONICS INC., Seoul (KR)

(72) Inventors: Hyeji Seo, Seoul (KR); Jiyoon Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 261 days.

(21) Appl. No.: 16/831,148

(22) Filed: Mar. 26, 2020

(65) Prior Publication Data

US 2021/0122049 A1    Apr. 29, 2021

(30) Foreign Application Priority Data

Oct. 28, 2019 (KR) .................. 10-2019-0134537

(51) Int. Cl.
| | |
|---|---|
| *B25J 9/16* | (2006.01) |
| *B25J 11/00* | (2006.01) |
| *B25J 13/08* | (2006.01) |
| *B25J 19/04* | (2006.01) |

(52) U.S. Cl.
CPC ............ *B25J 9/1679* (2013.01); *B25J 9/161* (2013.01); *B25J 9/1694* (2013.01); *B25J 11/0005* (2013.01); *B25J 13/08* (2013.01); *B25J 19/04* (2013.01)

(58) Field of Classification Search
CPC ........ B25J 9/1679; B25J 9/161; B25J 9/1694; B25J 11/0005; B25J 13/08; B25J 19/04; B25J 9/163; B25J 9/1669; B25J 9/1682; B25J 13/003; B25J 19/061; B25J 11/008; B25J 13/006; B25J 13/086; B25J 13/089; B25J 9/162; B25J 19/026; G05B 2219/40531; G05B 2219/23181; G05B 2219/37433; G10L 15/10; G10L 15/22; G05D 1/0255; G05D 2201/02; H04S 7/303

See application file for complete search history.

(56) References Cited

U.S. PATENT DOCUMENTS

| | | | |
|---|---|---|---|
| 2009/0210227 A1* | 8/2009 | Sugiyama | ............... G10L 15/22 901/46 |
| 2018/0213362 A1* | 7/2018 | Nishikawa | ............ H04W 4/029 |
| 2020/0342864 A1* | 10/2020 | Stanford | ............... G05D 1/0016 |

FOREIGN PATENT DOCUMENTS

JP         2020046478 A    *  3/2020

* cited by examiner

*Primary Examiner* — Abby Y Lin
*Assistant Examiner* — Esvinder Singh
(74) *Attorney, Agent, or Firm* — Ked & Associates LLP

(57) ABSTRACT

A first robot may include: a communication circuit configured to transmit and receive a signal; a sensor configured to detect a surrounding environment; a driving device configured to implement movement of the first robot; and a processor configured to control the first robot. The processor may determine a second voice recognition range of a second robot on the basis of a confirmation signal transmitted from the second robot. When a user is positioned outside the determined second voice recognition range, the processor may control the driving device so that the first robot follows the user.

20 Claims, 12 Drawing Sheets

ROBOT, METHOD OF OPERATING SAME, AND ROBOT SYSTEM INCLUDING SAME

CROSS-REFERENCE TO RELATED APPLICATION(S)

The present application claims priority to Korean Patent Application No. 10-2019-0134537, filed Oct. 28, 2019, the entire contents of which is incorporated herein for all purposes by this reference.

BACKGROUND

1. Field

Embodiments of the present disclosure relate to a robot, a method of operating the robot, and a robot system including the robot.

2. Background

Generally, a robot is a machine capable of automatically carrying out or performing a given operation by its own ability, and the robot is variably used in the industrial field, medical field, household, military field, marine field, etc. Recently, a communication type robot capable of performing communication or interaction with persons through voice or gesture has been increased.

In particular, in recent years, there has been an increasing demand for a robot that is capable of recognizing a user's voice and operating according to the user's voice. The robot may perform various operations according to the user's voice. In the meantime, when the robot is far from the user, the robot may not accurately recognize the user's voice. In particular, a fixed type robot of which a location is fixed may not operate as intended by the user, when the fixed type robot is far from the user.

BRIEF DESCRIPTION OF THE DRAWINGS

The embodiments will be described in detail with reference to the following drawings in which like reference numerals refer to like elements wherein.

DETAILED DESCRIPTION

Figure 1:
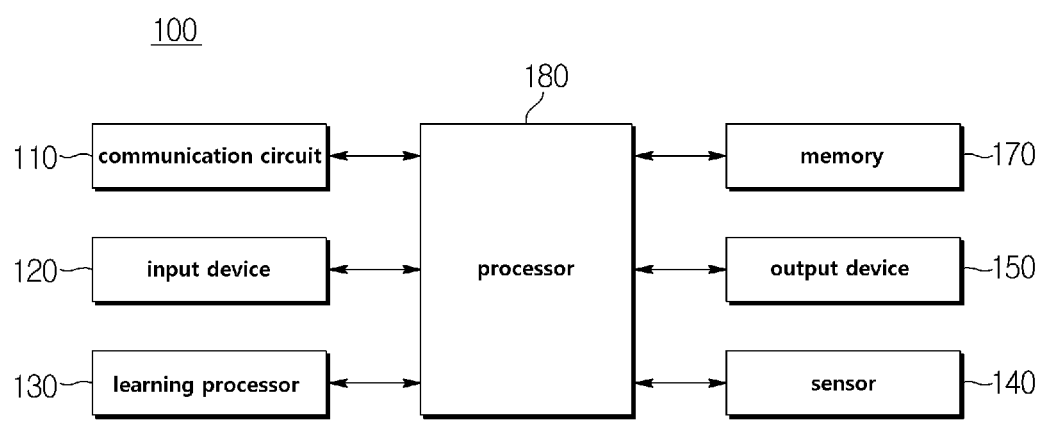
FIG. 1 is a view showing an AI apparatus according to an embodiment of the present disclosure.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

The artificial neural network may include an input layer, an output layer, and at least one selective hidden layer. Each layer may include at least one neuron, and the artificial neural network may include a synapse that connects neurons. In the artificial neural network, each neuron may output input signals input through a synapse, weights, and a function value of an activation function for a bias.

The model parameter means a parameter determined through learning, and includes a weight of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

An objective of performing learning for an artificial neural network is to determine a model parameter that minimizes a loss function. The loss function may be used as an index for determining an optimum model parameter in a learning process of the artificial neural network.

Machine learning may be classified into supervised learning, unsupervised learning, and reinforcement learning according to a learning method. Supervised learning may mean a method of performing learning for an artificial neural network where a label related to learning data is provided, and the label may mean a right answer (or result value) that has to be estimated by the artificial neural network when the learning data is input to the artificial neural network. Unsupervised learning may mean a method of performing learning for an artificial neural network where a label related to learning data is not provided. Reinforcement learning may mean a learning method performing learning so as to select, by an agent defined under a certain environment, an action or an order thereof such that an accumulated reward in each state is maximized.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

A robot may mean a machine capable of automatically carrying out or operating a given operation by its own ability. Particularly, a robot having a function of recognizing an environment, and performing an operation by performing determination by itself may be referred to as an intelligent robot. A robot may be classified into an industrial type, a medical type, a household type, a military type, etc. according to the usage purpose or field.

The robot may be provided with a manipulator including an actuator or a driving device so that the robot may perform various physical operations such as moving a robot joint, and so on. In addition, a movable robot may navigate on the ground or fly in the air by including wheels, brakes and propellers, etc.

Self-driving means the technology of autonomous driving, and a self-driving vehicle means a vehicle that drives without user's manipulations or with the minimum manipulation of the user. For example, self-driving may include the technique of maintaining a driving lane, the technique of automatically adjusting a speed such as adaptive cruise control, the technique of automatically driving along a predetermined route, the technique of automatically setting a route when a destination is set, etc. A self-driving vehicle may be referred to as a robot with a self-driving function.

Vehicles may include a vehicle with only an internal combustion engine, a hybrid vehicle with an internal combustion engine and an electric motor together, and an electric vehicle with only an electric motor, and may include not only automobiles but also trains and motorcycles.

Extended reality refers to virtual reality (VR), augmented reality (AR), and mixed reality (MR). The VR technique provides objects and backgrounds of the real world in CG images, the AR technique provides virtual CG images by reflecting the same on real object images, and the MR technique is a computer graphic technique mixing and coupling virtual objects and providing by reflecting the same in the real word.

The MR technique is similar to the AR technique in that real objects and virtual objects are provided together. In the AR technique, virtual objects are used to complement real objects, but in the MR technique, virtual objects and real objects are equivalently used.

The XR technique may be applied by using a head-mount display (HMD), a head-up display (HUD), a mobile phone, a tablet PC, a laptop PC, a desktop PC, a TV, a digital signage, etc., and a device to which the XR technique is applied may be referred to an XR device.

FIG. 1 is a view showing an AI apparatus 100 according to an embodiment of the present disclosure. The AI apparatus 100 may be employed in a fixed or movable type device such as TVs, projectors, mobile phones, smart phones, desktop PCs, laptop PCs, digital broadcasting terminals, PDAs (personal digital assistants), PMPs (portable multimedia player), navigations, tablet PCs, wearable devices, set-top boxes (STB), DMB receiver, radios, washers, refrigerators, digital signages, robots, vehicles, etc. The AI apparatus 100 may include a communication circuit 110, an input device 120, a learning processor 130, a sensor 140, an output device 150, a memory 170, and a processor 180.

The communication circuit 110 may transmit and receive data to/from another AI apparatuses (100a to 100e) or external devices such as an AI server 200 by using wired/wireless communication methods. For example, the communication circuit 110 may transmit and receive sensor information, user input, learning model, control signals, etc. to/from external devices.

Herein, communication methods used by the communication circuit 110 include global system for mobile communication (GSM)), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), etc.

The input device 120 may be for obtaining various types of data. Herein, the input device 120 may include a camera for an image signal input, a microphone for receiving audio signals, and a user input part for receiving information from the user. Herein, signals obtained from the camera or microphone by using the same as sensors may be referred to as sensing data or sensor information.

The input device 120 may be for obtaining input data used for outputting that is performed by using learning data and a learning model for model learning. The input device 120 may be for obtaining input data that is not processed. Herein, the processor 180 or learning processor 130 may obtain an input feature from input data as preprocessing.

The learning processor 130 may perform learning for a model configured with an artificial neural network by using learning data. Herein, the artificial neural network for which learning is performed may be referred to as a learning model. The learning model may be used for estimating a result value for new input data other than learning data, and the estimated value may be used as a reference for performing a certain operation.

The learning processor 130 may perform AI processing with a learning processor 240 of the AI server 200. The learning processor 130 may be integrated in the AI apparatus 100 or may include a memory employed therein. Alternatively, the learning processor 130 may be employed by using the memory 170, an external memory directly connected to the AI apparatus 100, or a memory maintained in an external device.

The sensor 140 may obtain at least one among internal information of the AI apparatus 100, surrounding environmental information of the AI apparatus 100, and user information by using various sensors. The sensor 140 may include a proximity sensor, an ambient light sensor, an acceleration sensor, a magnetic sensor, a gyro sensor, an inertial sensor, an RGB sensor, an IR sensor, a fingerprint recognizing sensor, a ultrasonic sensor, an optical sensor, a microphone, a lidar, a radar, etc.

The output device 150 may generate an output related to visual, auditory, or tactile. The output device 150 may include a display for visually outputting information, a speaker for acoustically outputting information, and a haptic actuator for tactually outputting information. For example, the display may output an image or video, the speaker may output a voice or sound, and the haptic actuator may output vibration.

The memory 170 may be for storing data supporting various functions of the AI apparatus 100. For example, in the memory 170, input data obtained through the input device 120, learning data, a learning model, a learning history, etc. may be stored.

The processor 180 may determine at least one executable operation of the AI apparatus 100 which is determined on the basis of information determined or generated by using a data analysis algorithm or machine learning algorithm. In addition, the processor 180 may perform the determined operation by controlling components of the AI apparatus 100. For the same, the processor 180 may make a request, retrieve, receive, or use data of the learning processor 130 or the memory 170, and control components of the AI apparatus 100 so as to perform the estimated operation of the at least one executable operation, or an operation that is determined to be desirable.

In order to perform the determined operation, the processor 180 may generate, when association with an external device is required, a control signal for controlling the corresponding external device, and transmit the generated control signal to the corresponding external device. The processor 180 may obtain intention information on the user's input, and determine a user's requirement on the basis of the obtained intention information.

The processor 180 may obtain intention information in association with the user's input by using at least one among a STT (speech-to-text) engine converting a voice input into text strings, and a natural language processing (NLP) engine obtaining intention information of natural language.

Herein, a part of the at least one among the STT engine and the NLP engine may be configured with an artificial neural network for which learning is performed according to a machine learning algorithm. In addition, for at least one among the STT engine and the NLP engine, learning may be performed by the learning processor 130, learning may be is performed by the learning processor 240 of the AI server 200, or learning may be performed through distribution processing of the above processors.

The processor 180 may collect record information including operation content of the AI apparatus 100 and user's feedback in association with the operation, etc. so as to store in the memory 170 or learning processor 130, or transmit the information to the external device such as an AI server 200, etc. The collected record information may be used when updating a learning model.

The processor 180 may control a part of components of the AI apparatus 100 so as to execute application programs stored in the memory 170. Further, the processor 180 may operate components of the AI apparatus 100 by combining at least two thereof so as to execute the application programs.

Figure 2:
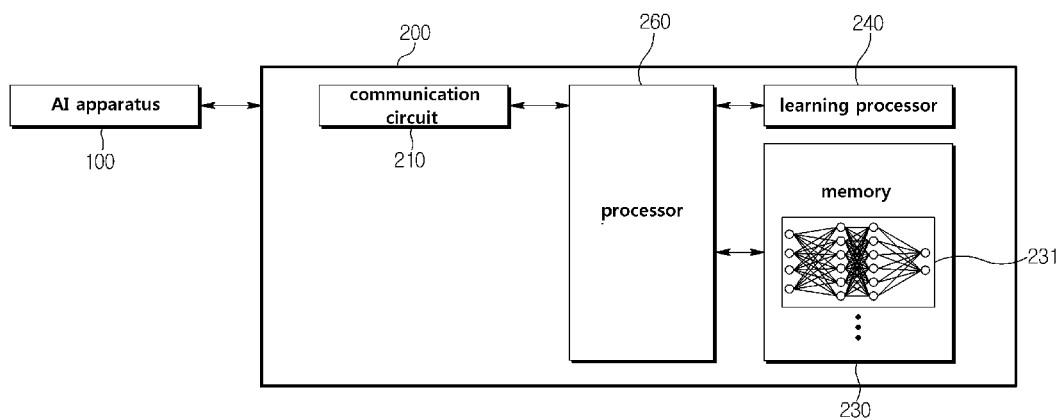
FIG. 2 is a view showing an AI server according to an embodiment of the present disclosure.

Referring to FIG. 2, an AI server 200 may mean a device performing learning for an artificial neural network by using a machine learning algorithm, or a device using the artificial neural network for which learning is performed. Herein, the AI server 200 may perform distributed processing by being configured with a plurality of servers, or may be defined as a 5G network. Herein, the AI server 200 may perform at least a part of AI processing by being included as a partial component of the AI apparatus 100. The AI server 200 may perform at least a part of AI processing by being included as a partial component of the AI apparatus 100.

The communication circuit 210 may transmit and receive data to/from the external devices such as AI apparatus 100, etc. The memory 230 may be for storing a model (or artificial neural network, 231) for which learning is ongoing or performed by the learning processor 240.

The learning processor 240 may perform learning for an artificial neural network 231a by using learning data. A learning model may be used by being integrated in the AI server 200 of the artificial neural network, or by being integrated in the external device such as an AI apparatus 100, etc.

The learning model may be employed in hardware, software, or combination thereof. When a part or the entire of the learning model is employed in software, at least one instruction constituting the learning model may be stored in the memory 230.

The processor 260 may estimate a result value for new input data by using the learning model, and generate a response or control command on the basis of the estimated result value.

Figure 3:
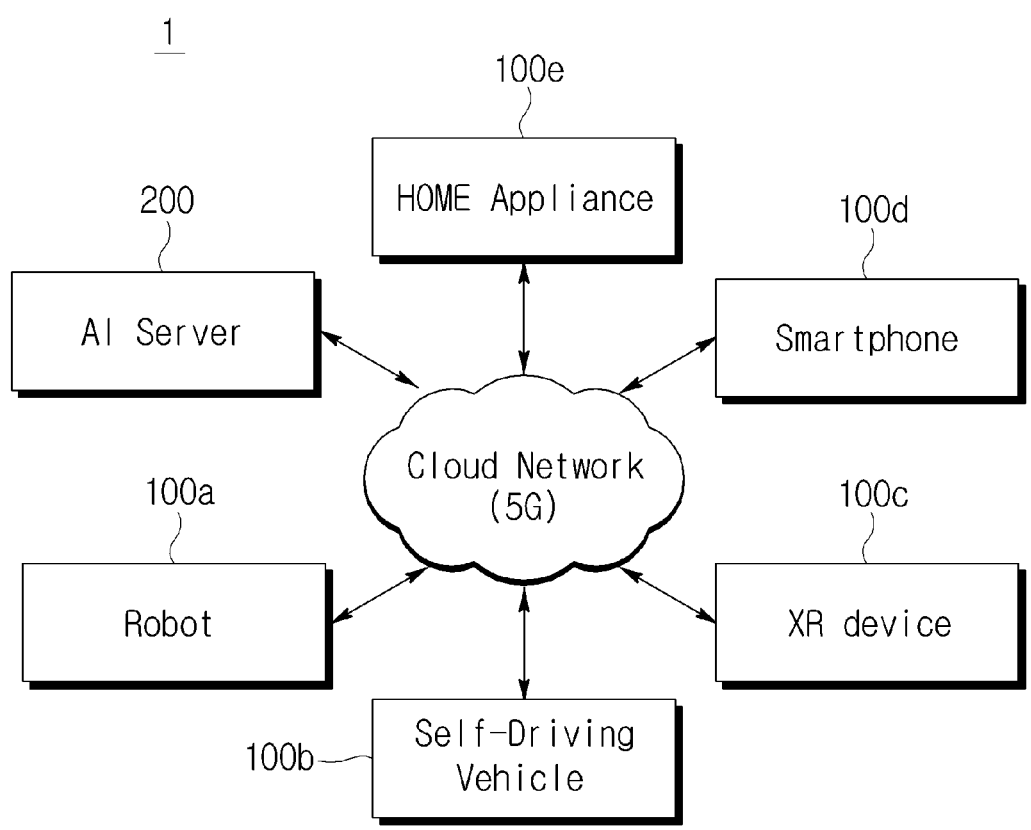
FIG. 3 is a view showing an AI system according to an embodiment of the present disclosure.

FIG. 3 is a view showing an AI system 1 according to an embodiment of the present disclosure. The AI system 1 is connected to at least one cloud network 10 among the AI server 200, a robot 100a, self-driving vehicle 100b, an XR device 100c, a smart phone 100d, and a home appliance 100e. Herein, the robot 100a, the self-driving vehicle 100b, the XR device 100c, the smart phone 100d or the home appliance 100e to which the AI technique is applied may be referred to as the AI apparatus (100a to 100e).

The cloud network 10 may mean a network constituting a part of cloud computing infrastructure or a network present in the cloud computing infrastructure. Herein, the cloud network 10 may be configured by using a 3G network, a 4G or LTE network, a 5G network, etc.

In other words, each device (100a to 100e, 200) constituting the AI system 1 may be connected with each other through the cloud network 10. Particularly, each device (100a to 100e, 200) may perform communication with each other through a base station, and also may perform direct communication without using the base station.

The AI server 200 may include a server performing AI processing, and a server performing calculation for big data. The AI server 200 may be connected to at least one among AI apparatus constituting an AI system 1 configured with the robot 100a, the self-driving vehicle 100b, the XR device 100c, the smart phone 100d, and the home appliance 100e through the cloud network 10, and the AI server 200 may support a part of the AI processing of the connected AI apparatuses (100a to 100e).

The AI server 200 may perform learning on an artificial neural network according to a machine learning algorithm in place of the AI apparatus (100a to 100e), may directly store a learning model, or transmit the learning model to the AI apparatus (100a to 100e). The AI server 200 may receive input data from the AI apparatus (100a to 100e), estimate a result value for the received input data by using a learning model, and generate a response or control command on the basis of the estimated result value so as to transmit the same to the AI apparatus (100a to 100e).

Alternatively, the AI apparatus (100a to 100e) may estimate a result value for the received input data by directly using a learning model, and generate a response or control command on the basis of the estimated result value.

Various examples of the AI apparatus (100a to 100e) to which the above described technique is applied will be described. The AI apparatus (100a to 100e) shown in FIG. 3 may be referred to a detailed example of the AI apparatus 100 shown in FIG. 1.

The robot 100a may be employed as a guide robot, a transport robot, a cleaning robot, a wearable robot, an entertainment robot, a pet robot, an unmanned flying robot, etc. by applying the AI technique thereto. The robot 100a may include a robot control module for controlling operations, and the robot control module may mean a software module or a chip where the same is employed therein.

The robot 100a may obtain state information of the robot 100a, detect (recognize) a surrounding environment or objects, generate map data, determine a moving path or driving plan, determine a response in association with a user interaction, or determine operations by using sensor information that is obtained through various types of sensors.

In order to determine a moving path or driving plan, the robot 100a may use sensor information obtained by using at least one sensor of a lidar, a radar, and a camera.

The robot 100a may perform the above operations by using a learning model configured with at least one artificial neural network. For example, the robot 100a may recognize a surrounding environment and objects by using a learning model, and determine operations by using the recognized surrounding environment information or object information. Herein, the learning model may be obtained by directly performing learning by the robot 100a, or by performing learning by the external device such as an AI server 200, etc.

The robot 100a may generate a result by directly using the learning model so as to perform operations. However, the robot 100a may transmit the sensor information to the external device such as an AI server 200, and receive a result generated according thereto so as to perform operations.

The robot 100a may determine a moving path and a driving plan by using at least one among map data, object information detected from the sensor information, and object information obtained from the external device, and may drive according to the determined moving path and the driving plan by controlling a driving part.

Map data may include object identification information on various objects arranged in a space where the robot 100a moves. For example, the map data may include object identification information on fixed objects such as walls, doors, etc., and movable objects such as flowerpots, tables, etc. In addition, the object identification information may include a name, a type, a distance, a position, etc.

In addition, the robot 100a may perform operations or drive by controlling the driving part on the basis of the user's control/interaction. Herein, the robot 100a may obtain intention information on interaction according to a user's behavior or voice input, and determine a response on the basis of the obtained intention information so as to perform operations.

The self-driving vehicle 100b may be employed as a movable robot, a vehicle, an unmanned flying robot, etc. by applying the AI technique thereto. The self-driving vehicle 100b may include a self-driving control module controlling a self-driving function, and the self-driving control module may mean a software module or a chip where the same is employed in hardware. The self-driving control module may be included in the self-driving vehicle 100b as a component thereof, but may be connected to the self-driving vehicle 100b by being configured in separate hardware.

The self-driving vehicle 100b may obtain state information of the self-driving vehicle 100b, detect (recognize) a surrounding environment and objects, generate map data, determine a moving path and a driving plan, or determine operations by using sensor information obtained through various types of sensors.

In order to determine a moving path or driving plan, the self-driving vehicle 100b, similar to the robot 100a, may use sensor information obtained by using at least one sensor of a lidar, a radar, and a camera.

Particularly, the self-driving vehicle 100b may recognize an environment and objects for areas that are hidden from view or over a certain distance by receiving sensor information from external devices, or by receiving information directly recognized from the external devices.

The self-driving vehicle 100b may perform the above operations by using a learning model configured with at least one artificial neural network. For example, the self-driving vehicle 100b may recognize a surrounding environment and objects by using a learning model, and determine a driving path by using the recognized surrounding environment information or object information. Herein, the learning model may be obtained by directly performing learning by the self-driving vehicle 100b, or by performing learning by the external device such as an AI server 200, etc.

Herein, the self-driving vehicle 100b may generate a result by directly using the learning model so as to perform operations. However, the self-driving vehicle 100b may transmit the sensor information to the external device such as an AI server 200, and receive a result generated according thereto so as to perform operations.

The self-driving vehicle 100b may determine a moving path and a driving plan by using at least one among map data, object information detected from the sensor information, and object information obtained from the external device, and drive according to the determined moving path and the driving plan by controlling a driving part.

Map data may include object identification information on various objects (for example, roads) arranged in a space where the self-driving vehicle 100b drives. For example, the map data may include object identification information on fixed objects such as street lamps, rocks, buildings, etc. and movable objects such as vehicles, pedestrians, etc. In addition, the object identification information may include a name, a type, a distance, a position, etc.

In addition, the self-driving vehicle 100b may perform operations or drive by controlling the driving part on the basis of the user's control/interaction. Herein, the self-driving vehicle 100b may obtain intention information on interaction according to a user's behavior or voice input, and determine a response on the basis of the obtained intention information so as to perform operations.

The XR device 100c may be employed by using a HMD, a HUD provided in a vehicle, a TV, a mobile phone, a smart phone, a PC, a wearable device, a home appliance, a digital signage, a vehicle, or a fixed type robot or movable type robot.

The XR device 100c analyze 3D point cloud data or image data which is obtained through various sensors or external devices, generate position data and feature data on 3D points, and obtain information on a surrounding space and real objects and output XR objects to be rendered. For example, the XR device 100c may output XR objects including additional information on the recognized objects by reflecting the same in the corresponding recognized objects.

The XR device 100c may perform the above operations by using a learning model configured with at least one artificial neural network. For example, the XR device 100c may recognize real objects from 3D point cloud data or image data by using a learning model, and provide information in association with the recognized real objects. Herein, the learning model may be obtained by directly performing learning by the XR device 100c, or by performing learning by the external device such as an AI server 200, etc.

The XR device 100c may generate a result by directly using the learning model so as to perform operations. However, the XR device 100c may transmit the sensor information to the external device such as an AI server 200, and receive a result generated according thereto so as to perform operations.

The robot 100a may be employed as a guide robot, a transport robot, a cleaning robot, a wearable robot, an entertainment robot, a pet robot, an unmanned flying robot, etc. by applying the AI technique and the self-driving technique thereto. The robot 100a to which the AI technique and the self-driving technique are applied may mean a robot itself with a self-driving function, or the robot 100a operating in conjunction with the self-driving vehicle 100b. The robot 100a with the self-driving function may refer to all devices moving by itself according to a given movement, or by determining a moving path by itself without a user control.

The robot 100a and the self-driving vehicle 100b which respectively have self-driving functions may use a common sensing method for determining at least one among a moving path and a driving plan. For example, the robot 100a and the self-driving vehicle 100b which respectively have self-driving functions may determine a moving path or driving plan by using information sensed through a lidar, a radar, a camera, etc.

The robot 100a operating in conjunction with the self-driving vehicle 100b may be present separate from the self-driving vehicle 100b, while the robot 100a is internally or externally connected to the self-driving function of the self-driving vehicle 100b, or may perform operations in association with the driver of the self-driving vehicle 100b.

Herein, the robot 100a operating in conjunction with the self-driving vehicle 100b may obtain sensor information in place of the self-driving vehicle 100b so as to provide the information to the self-driving vehicle 100b, or obtain sensor information and generate surrounding environment information or object information so as to provide the information to the self-driving vehicle 100b, and thus control or supplement the self-driving function of the self-driving vehicle 100b.

Alternatively, the robot 100a operating in conjunction with the self-driving vehicle 100b may monitor a driver of the self-driving vehicle 100b, or control functions of the self-driving vehicle 100b by operating in conjunction with the driver. For example, when it is determined that the driver is drowsy, the robot 100a may activate the self-driving function of the self-driving vehicle 100b or control the driving part of the self-driving vehicle 100b. Herein, functions of the self-driving vehicle 100b which are controlled by the robot 100a include, in addition to the self-driving function, functions provided from a navigation system or audio system provided in the self-driving vehicle 100b.

Alternatively, the robot 100a operating in conjunction with the self-driving vehicle 100b may provide information or supplement functions of the self-driving vehicle 100b from the outside of the self-driving vehicle 100b. For example, the robot 100a may provide traffic information including signal information such as smart signals to the self-driving vehicle 100b, or may automatically connect to an electrical charging device such as an automatic electric charger of an electric vehicle by operating in conjunction with the self-driving vehicle 100b.

The robot 100a may be employed as a guide robot, a transport robot, a cleaning robot, a wearable robot, an entertainment robot, a pet robot, an unmanned flying robot, a drone, etc. by applying the AI technique and the XR technique thereto.

The robot 100a to which the XR technique is applied may mean a robot that becomes a target controlled/operated within an XR image. Herein, the robot 100a may be distinguished from the XR device 100c and operate in conjunction with the same.

For the robot 100a that becomes a target controlled/operated within an XR image, when sensor information is obtained from sensors including a camera, the robot 100a or the XR device 100c may generate an XR image on the basis of the sensor information, and the XR device 100c may output the generated XR image. In addition, the above robot 100a may operate on the basis of a control signal input through the XR device 100c, or in conjunction with the user.

For example, the user may check an XR image in association with a view of the robot 100a that is in conjunction with the external device such as XR device 100c in a remote manner, adjust a self-driving path of the robot 100a through in conjunction with the robot 100a, control operations or driving, or check information on surrounding objects.

The self-driving vehicle 100b may be employed as a movable robot, a vehicle, an unmanned flying robot, etc. by applying the AI technique and the XR technique thereto. The self-driving vehicle 100b to which the XR technique is applied may mean self-driving vehicle provided with a device providing an XR image, and self-driving vehicle that becomes a target controlled/operated within an XR image, etc. Particularly, the self-driving vehicle 100b that becomes a target controlled/operated within an XR image may be distinguished from the XR device 100c, and operate in conjunction with the same.

The self-driving vehicle 100b provided with a device providing an XR image may obtain sensor information from sensors including a camera, and output an XR image generated on the basis of the obtained sensor information. For example, the self-driving vehicle 100b outputs an XR image by using a HUD, and thus provides to a passenger a real object or XR object in association with objects within a screen.

Herein, when the XR object is displayed on the HUD, at least a part of the XR object may be displayed to overlap the real object to which the passenger's eyes are directed. On the other hand, when the XR object displayed on a display included in the self-driving vehicle 100b, at least a part of the XR object may be displayed to overlap an object within the screen. For example, the self-driving vehicle 100b may output XR objects in association with carriageways, other vehicles, signals, traffic signs, motorcycles, pedestrians, buildings, etc.

For the self-driving vehicle 100b that becomes a target controlled/operated within an XR image, when sensor information is obtained from sensors including a camera, the self-driving vehicle 100b or XR device 100c may generate an XR image on the basis of the sensor information, and the XR device 100c may output the generated XR image. In addition, the above self-driving vehicle 100b may operate on the basis of a control signal input through the external device such as XR device 100c, etc. or in conjunction with the user.

Figure 4:
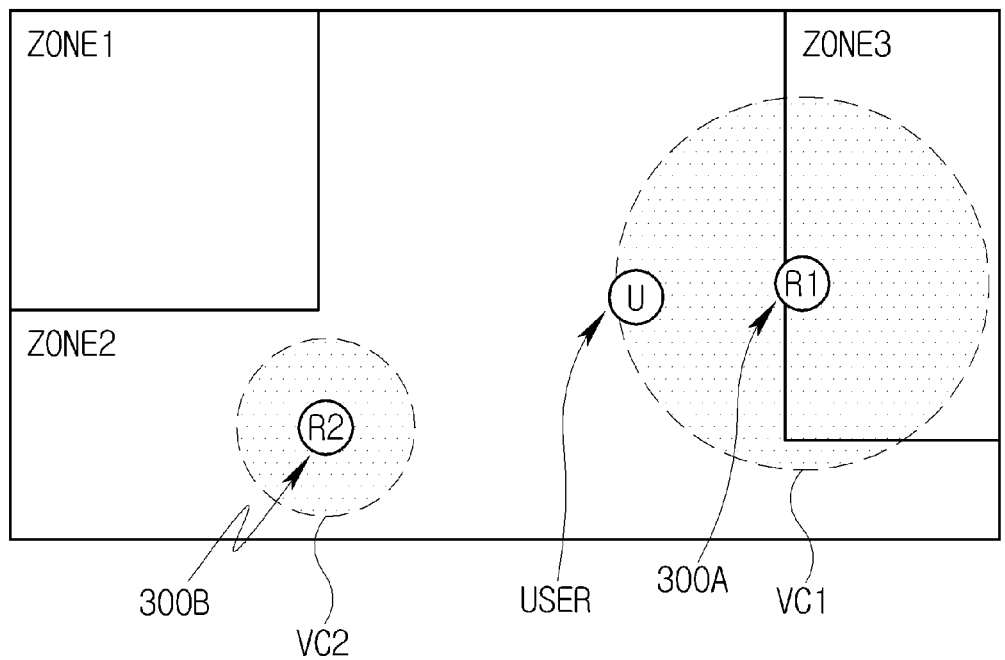
FIG. 4 is a view showing a robot system according to embodiments of the present disclosure.

FIG. 4 is a view showing a robot system according to embodiments of the present disclosure. Referring to FIGS. 1 to 4, a robot system 20 may include a first robot 300A and a second robot 300B. The first robot 300A and the second robot 300B may perform the functions of the AI apparatus 100 described with reference to FIGS. 1 to 3. The first robot 300A and the second robot 300B may communicate with each other over a wireless network.

The first robot 300A and the second robot 300B may operate on the basis of the user USER's voice (hereinafter, also referred to as a user voice). According to embodiments, the first robot 300A and the second robot 300B may receive the user voice and may operate on the basis of activation words and instructions contained in the user voice. For example, the first robot 300A and the second robot 300B may be woken up in response to the activation word contained in the user voice, and may perform an operation corresponding to the instruction.

According to embodiments, the first robot 300A and the second robot 300B may perform a fundamental operation unrelated to the user voice. The fundamental operation may refer to an operation defined in advance regardless of the user's voice. For example, the fundamental operation may refer to an operation that is not induced by the user's voice.

For example, the first robot 300A may perform the fundamental operation on the basis of a wireless signal, a touch, or a push, and may perform the fundamental operation according to a preset scheduling. According to embodiments, the first robot 300A and the second robot 300B may be a cleaning robot, a guide robot, a lawnmower robot, a serving robot, a display robot, or the like, which may operate moving in zones ZONE1 to ZONE3 regardless of the user voice.

The robots 300A and 300B and the user USER may be positioned in a space including the multiple zones ZONE1 to ZONE3. For example, the second robot 300B and the user USER may be positioned in a second zone ZONE2, and the first robot 300A may be positioned in a third zone ZONE3. According to embodiments, the position of the second robot 300B may be fixed and the position of the first robot 300A may be variable. For example, the second robot 300B may be a fixed type robot that does not include a moving device (or a driving device) for moving the second robot 300B, and the first robot 300A may be a movable type robot that includes a driving device for moving the first robot 300A. Herein, the first robot 300A may move in the zones ZONE1 to ZONE3. In the meantime, according to embodiments, both of the first robot 300A and the second robot 300B may be movable type robots. Hereinafter, for convenience of description, it is assumed that the first robot 300A is the movable type robot and the second robot 300B is the fixed type robot.

The robots 300A and 300B may have a voice recognition range. According to embodiments, a voice recognition range may refer to a range in which the robots 300A and 300B are capable of recognizing or processing the user voice. For example, the robots 300A and 300B may not recognize the user voice of the user who is positioned outside the voice recognition range, but may recognize the user voice of the user who is positioned within the voice recognition range.

The first robot 300A may have a first voice recognition range VC1, and the second robot 300B may have a second voice recognition range VC2. Although the voice recognition ranges VC1 and VC2 of the robots 300A and 300B are designated by circles in FIG. 4, embodiments of the present disclosure are not limited to the specific forms of the voice recognition ranges VC1 and VC2.

As shown in FIG. 4, in the case where the user USER belongs in the first voice recognition range VC1, but is positioned outside the second voice recognition range VC2, the first robot 300A operates in response to the user voice of the user USER, but the second robot 300B may not operate in response to the user voice. In the present specification, the expression "the outside" may refer to a region except "the inside", and the expression "the outside" may include the boundary between "the outside" and "the inside", but it is not limited thereto.

The first robot 300A, according to embodiments of the present disclosure, may determine the second voice recognition range VC2 of the second robot 300B, and may operate in response to the user voice determined to be outside the second voice recognition range VC2. For example, the first robot 300A may move out of the second voice recognition range VC2 and may then operate in response to the user voice. Alternatively, the first robot 300A may operate in response to the user voice when the user USER is positioned outside the second voice recognition range VC2.

Figure 5:
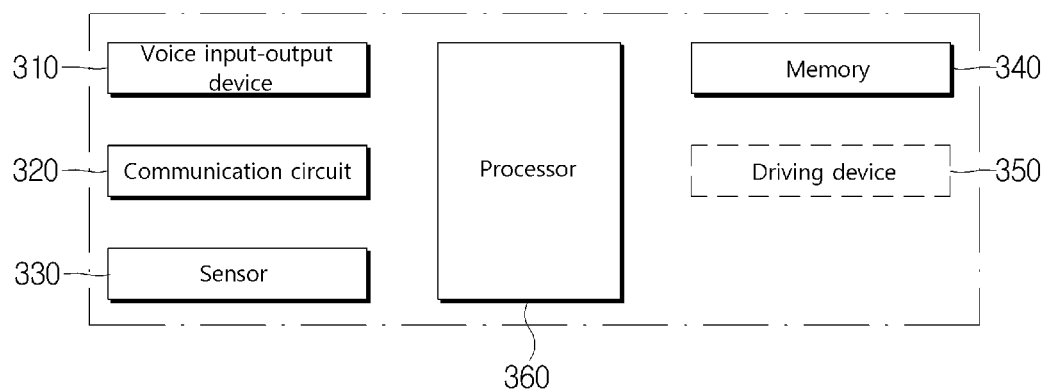
FIG. 5 is a view conceptually showing a robot according to embodiments of the present disclosure.

FIG. 5 is a view conceptually showing a robot according to embodiments of the present disclosure. Referring to FIGS. 1 to 5, a robot 300 may include a voice input-output device 310, a communication circuit 320 (or a communication device), a sensor 330, a memory 340, a driving device 350, and a processor 360. In the meantime, the robot 300 shown in FIG. 5 may refer to any one of the robots 300A and 300B described with reference to FIG. 4. That is, the robots 300A and 300B may be configured to include at least a part among elements 310, 320, 330, 340, 350, and 360 which will be described with reference to FIG. 5.

The voice input-output device 310 may be configured to receive a voice and output a voice. According to embodiments, the voice input-output device 310 may include at least one of the following: a microphone detecting a voice from outside and converting the detected voice into an electrical signal; and a speaker generating a voice from an electrical signal and outputting the generated voice to outside. The robot 300 may perform voice recognition by using the voice input-output device 310.

The communication circuit 320 may be configured to transmit and receive wireless signals. According to embodiments, the communication circuit 320 may be a transceiver configured to transmit and receive wireless signals. According to embodiments, the communication circuit 320 may perform the function of the communication circuit 110 shown in FIG. 1. For example, the communication circuit 320 may perform communication with another robot or a server.

The sensor 330 may detect the surrounding environment of the robot 300 and may generate information on the detected surrounding environment. According to embodiments, the sensor 330 may include a camera, a lidar, a radar, an ultrasonic sensor, a proximity sensor, an optical sensor, or the like, but it is not limited thereto. For example, the sensor 330 may detect the user USER and may generate information (for example, image data) for identifying the user USER according to a result of the detection.

The memory 340 may store data required for the operation of the robot 300. According to embodiments, the memory 340 may include at least one among a non-volatile memory device and a volatile memory device.

The driving device 350 may generate driving force to move the robot 300. According to embodiments, the driving device 350 may be a motor, an actuator, or a steering device, but it is not limited thereto. The driving device 350 may generate driving force for walking or driving of the robot 300. For example, the robot 300 may include a traveling device or a walking device, such as a wheel, a belt, a leg, or the like, and may move by transferring the driving force generated by the driving device 350 to the traveling device or the walking device. According to embodiments, in the case where the robot 300 is the fixed type robot, the robot 300 may not include the driving device 350.

The processor 360 may be configured to control the overall operations of the robot 300. According to embodiments, the processor 360 may include a processor having a calculation processing function. For example, the processor 360 may include a calculation processing device such as CPU (central processing unit), MCU (micro computer unit), GPU (graphics processing unit), etc., but it is not limited thereto.

The processor 360 may generate an operation command corresponding to the user voice input from the voice input-output device 310, and may control the robot 300 by using the generated operation command. In addition, the processor 360 may generate an operation command corresponding to a wireless signal received through the communication circuit 320, and may control the robot 300 by using the generated operation command.

According to embodiments, the processor 360 may load instructions (or a program including instructions) stored in the memory 340, and may control the operations of the robot 300 according to the execution of the loaded program. For example, the processor 360 may perform, among the operations stored in the memory 340, the operation corresponding to the input user voice or the received wireless signal.

The processor 360 may control the driving device 350. According to embodiments, the processor 360 may control the driving device 350 to move the robot 300 to a particular position.

The processor 360 may perform an operation by using detection data generated by the sensor 330. The processor 360 may calculate, on the basis of the detection data generated by the sensor 330, a distance between the robot 300 and the user USER or the position of the user USER. According to embodiments, the processor 360 may calculate the position of the user USER by using map data stored in the memory 340.

According to embodiments, in the case where the sensor 330 is a vision sensor, such as a camera, the sensor 330 may acquire an image of the user USER, and the processor 360 may compare the image acquired by the sensor 330 and the stored map data and may calculate the position of the user USER according to a result of the comparison.

Further, the processor 360 may control the robot 300 so that the robot 300 continuously follows the user USER on the basis of the detection data. The processor 360 may control operations of the memory 340. According to embodiments, the processor 360 may load data from the memory 340, or write data on the memory 340.

Figure 6:
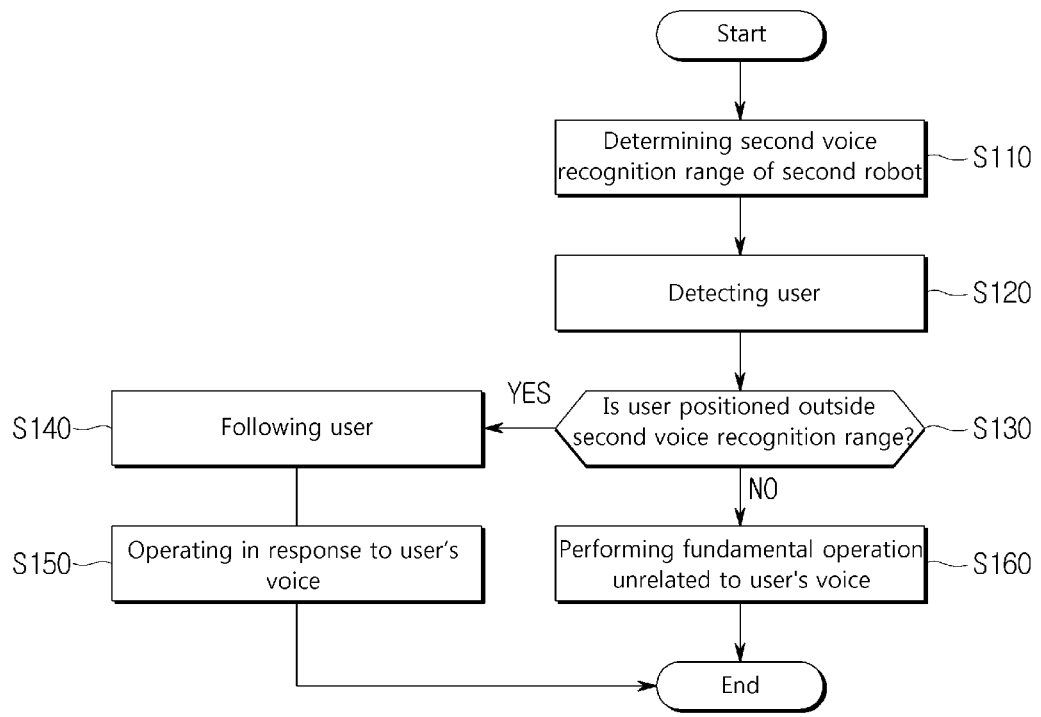
FIG. 6 is a flowchart showing a method of operating a robot according to embodiments of the present disclosure.

FIG. 6 is a flowchart showing a method of operating a robot according to embodiments of the present disclosure. The method shown in FIG. 6 may be performed by the processor 360 of the robot 300. In addition, the method may be implemented by instructions executable by the processor 360.

Referring to FIGS. 1 to 6, the first robot 300A may determine the second voice recognition range VC2 of the second robot 300B, at step S110. According to embodiments, the first robot 300A may determine the second voice recognition range VC2 in which the second robot 300B is capable of recognizing the user USER's voice. A method of determining the second voice recognition range VC2 will be described later.

The first robot 300A may detect the user USER, at step S120. According to embodiments, the first robot 300A may detect the user USER by using the sensor. For example, the first robot 300A may detect the surroundings of the first robot 300A, and may recognize the user USER according to a result of the detection.

According to embodiments, when the first robot 300A detects a voice or sound, the first robot 300A detects a region in which the voice or the sound occurs, by using the sensor, and may recognize the user USER according to a result of the detection. According to embodiments, the first robot 300A may recognize the user USER by using the detection data generated as the result of the detection by the sensor and the stored data. For example, when an object is detected, the first robot 300A may recognize the user USER on the basis of the appearance (for example, shape, face, form, color, etc.) of the object and the stored data for identifying the user USER.

When the user USER is detected, the first robot 300A determines, on the basis of the position of the user USER, whether the user USER is positioned outside the second voice recognition range VC2, at step S130. According to embodiments, the first robot 300A may compare the calculated position of the user and the second voice recognition range VC2 determined, and may determine whether the user USER is positioned within the second voice recognition range VC2 according to a result of the comparison.

The first robot 300A may calculate the position of the user USER, and may determine, on the basis of the position of the user USER and the second voice recognition range VC2 determined, whether the user USER is positioned within the second voice recognition range VC2. According to embodiments, the first robot 300A may calculate the position of the user USER through the sensor. For example, the first robot 300A may detect the user USER by using the sensor, and may calculate the position of the user USER by using the detection data and the stored map data.

When the user USER is positioned outside the second voice recognition range VC2 at step S130—YES, the first robot 300A follows the user USER at step S140. According to embodiments, the processor of the first robot 300A may detect the user USER by using the sensor, and may control the driving device so that the first robot 300A follows the user USER. For example, the first robot 300A may detect movement of the user USER by using the sensor, and may control movement of the robot 300A on the basis of the detected movement of the user USER. Herein, the robot 300A may follow the user USER while maintaining a reference distance.

According to embodiments, the first robot 300A may follow the user USER so that the user USER is positioned in the first voice recognition range VC1 of the first robot 300A. For example, the first robot 300A may determine a reference distance on the basis of the first voice recognition range VC1, and may follow the user USER while maintaining the determined reference distance. The first robot 300A may change the first voice recognition range VC1 on the basis of the surrounding noise.

According to embodiments, the first robot 300A may provide a notification that the user USER is not positioned within the second voice recognition range VC2, to the user USER. In addition, the first robot 300A may transmit a signal indicating that the user USER is not positioned within the second voice recognition range VC2, to the second robot 300B.

According to embodiments, when the user USER is not positioned outside (i.e. positioned within) the second voice recognition range VC2 at step S130-NO, the first robot 300A performs the fundamental operation unrelated to the user USER's voice.

The first robot 300A may perform an operation in response to the user USER's voice while following the user USER, at step S150.

The first robot 300A may perform the operation corresponding to the user USER's voice in response to the user USER's voice. According to embodiments, the processor of the first robot 300A may recognize the activation word contained in the user USER's voice, and may operate a particular operation on the basis of the instruction contained in the user USER's voice.

According to embodiments, the processor of the first robot 300A may recognize a first activation word, which is contained in the user USER's voice, for activating the first robot 300A. When recognizing the first activation word, an operation is performed according to the command corresponding to the user USER's voice.

According to embodiments, the first robot 300A may recognize not only the first activation word for the first robot 300A but also a second activation word for the second robot 300B. For example, the first robot 300A may recognize the second activation word from the user USER's voice, and may then perform one of the following: transmit the user USER's voice to the second robot 300B; perform an operation according to the command corresponding to the user USER's voice; and transmit the command corresponding to the user USER's voice to the second robot 300B.

When the user is not positioned outside the second voice recognition range VC2 at step S130—NO, the first robot 300A performs the fundamental operation unrelated to the user USER's voice at step S160. The fundamental operation may refer to the operation that is not induced by the user's voice. For example, as an example of the fundamental operation, the first robot 300A may stop at the current position or may move to the initial position. The first robot 300A may not follow the user USER.

According to embodiments, when the user is not positioned outside the second voice recognition range VC2 at step S130—NO, the first robot 300A does not process the user USER's voice. For example, the first robot 300A may ignore the voice (or the activation word) spoken by the user USER who is positioned within the second voice recognition range VC2.

According to embodiments, the first robot 300A may transmit, to the second robot 300B, a signal indicating that the user USER is not positioned outside the second voice recognition range VC2. The second robot 300B may prepare to perform voice recognition in response to the signal.

According to embodiments of the present disclosure, when the user USER is positioned outside the second voice recognition range VC2 of the second robot 300B, the first robot 300A performs an operation in response to the user USER's voice.

Figure 7:
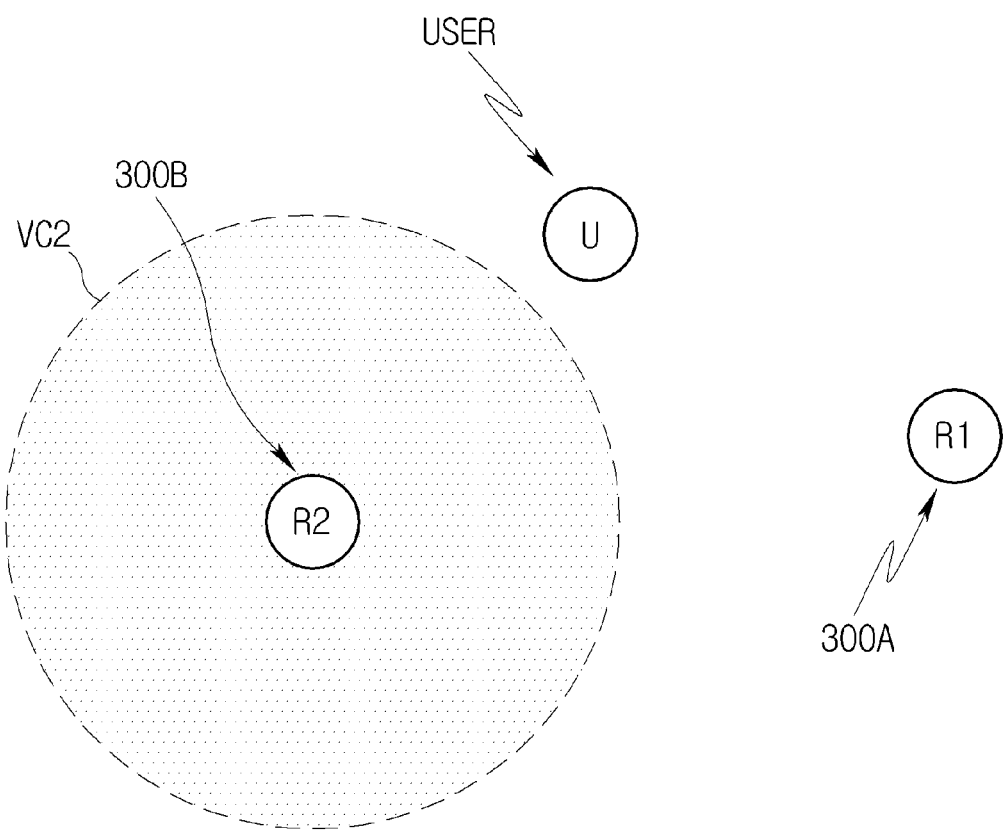
FIGS. 7 to 10 are views showing an operation of a robot according to embodiments of the present disclosure.
Figure 8:
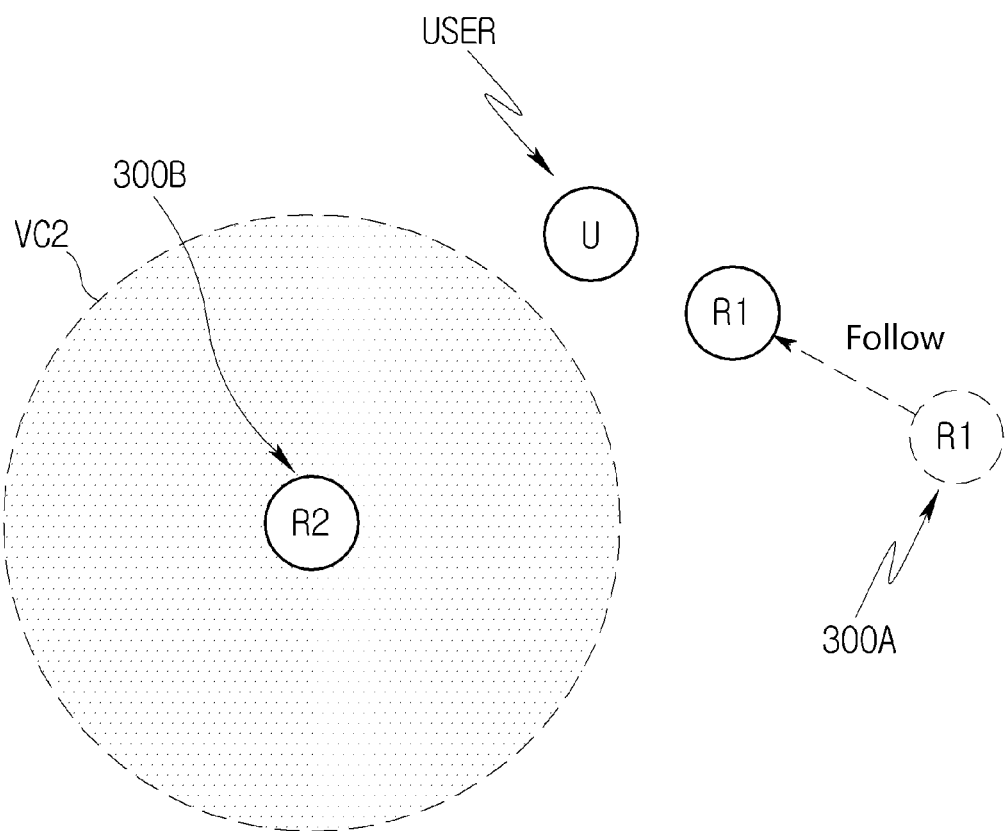
Figure 9:
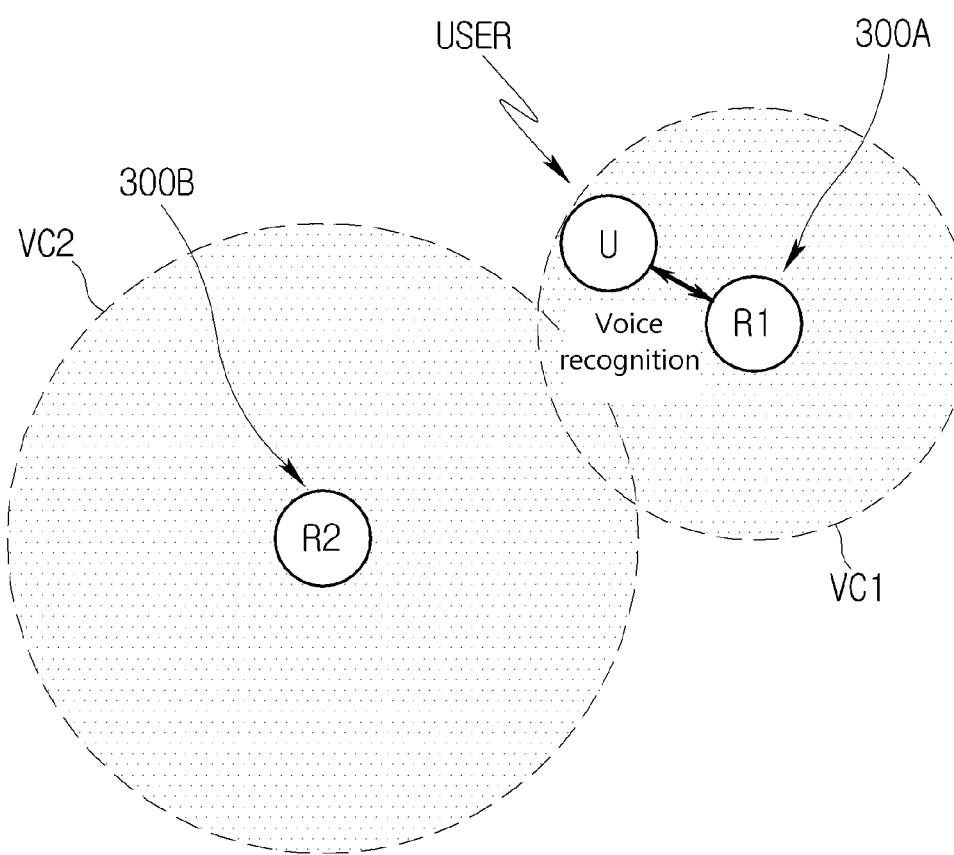

FIGS. 7 to 10 are views showing an operation of a robot according to embodiments of the present disclosure. FIGS. 7 to 9 shows a situation in which the user USER is positioned outside the second voice recognition range VC2 of the second robot 300B. Referring to FIGS. 7 to 9, the first robot 300A may recognize the user USER and may determine whether the user USER is positioned within the second voice recognition range VC2 of the second robot 300B. When the user USER is positioned outside the second voice recognition range VC2, the first robot 300A follows the user USER. According to embodiments, the first robot 300A may approach the user USER or may follow the user USER, while maintaining the reference distance with the user USER. For example, the first robot 300A may follow the user USER so that the user USER belongs in the first voice recognition range VC1 of the first robot 300A.

The first robot 300A may operate in response to the user USER's voice while following the user USER. As described above, the first robot 300A may follow the user USER so that the user USER belongs in the first voice recognition range VC1 of the first robot 300A, so that the user USER's voice can be recognized and processed normally.

In response to the user USER's voice, the first robot 300A may perform the operation corresponding to the voice. According to embodiments, in the case where the command corresponding to the user USER's voice is a music play command, the first robot 300A may play music in response to the user USER's voice.

In response to the user USER's voice, the first robot 300A may transmit the voice to the second robot 300B. According to embodiments, the first robot 300A may transmit the user USER's voice in the form of data, to the second robot 300B.

In response to the user USER's voice, the first robot 300A may transmit a command corresponding to the voice, to the second robot 300B. According to embodiments, in the case where the command corresponding to the user USER's voice is a music play command, the first robot 300A may transmit the music play command to the second robot 300B.

According to embodiments, the first robot 300A may determine whether an operation corresponding to the user USER's voice is able to be performed by the first robot 300A. For example, the first robot 300A may compare the operation corresponding to the user USER's voice with the operations stored in the memory, and may determine whether the operation corresponding to the user USER's voice is able to be performed by the first robot 300A, according to a result of the comparison.

When the operation corresponding to the user USER's voice is able to be performed, the first robot 300A performs the operation. Conversely, when the operation corresponding to the user USER's voice is unable to be performed, the first robot 300A transmit an operation command corresponding to the user USER's voice, to the second robot 300B.

Figure 10:
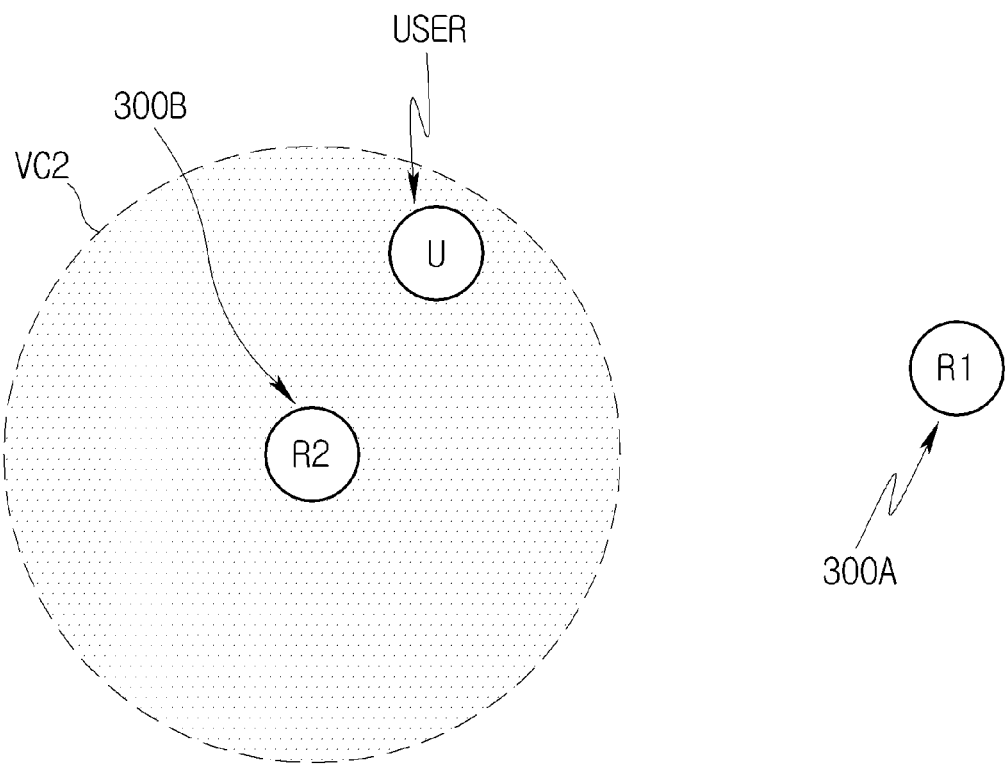

FIG. 10 shows a situation in which the user USER is positioned within the second voice recognition range VC2 of the second robot 300B. Referring to FIG. 10, the first robot 300A may recognize the user USER and may determine whether the user USER is positioned outside the second voice recognition range VC2 of the second robot 300B. When the user USER is not positioned outside the second voice recognition range VC2 (for example, positioned within the second voice recognition range VC2), the first robot 300A performs the fundamental operation unrelated to the user USER's voice. For example, the first robot 300A may move to the initial position.

When the user USER is positioned outside the second voice recognition range VC2 of the second robot 300B, the second robot 300B is capable of operating in response to the user USER's voice, and thus the first robot 300A does not need to process the user USER's voice. Therefore, in this case, the first robot 300A may ignore the user USER's voice and may not process it.

According to embodiments, the first robot 300A may transmit, to the second robot 300B, a signal indicating that the user USER is positioned within the second voice recognition range VC2. The second robot 300B may prepare to perform voice recognition in response to the signal.

According to embodiments, the second robot 300B may monitor the user USER within the second voice recognition range VC2. According to a result of the monitoring, when the user USER gets out of the second voice recognition range VC2, the second robot 300B transmits, to the first robot 300A, a signal indicating that the user USER gets out of the second voice recognition range VC2. Herein, in response to this signal, the first robot 300A may approach the second voice recognition range VC2, and may determine whether the user USER is positioned outside the second voice recognition range VC2. According to a result of the determination, the first robot 300A may follow the user USER.

Figure 11:
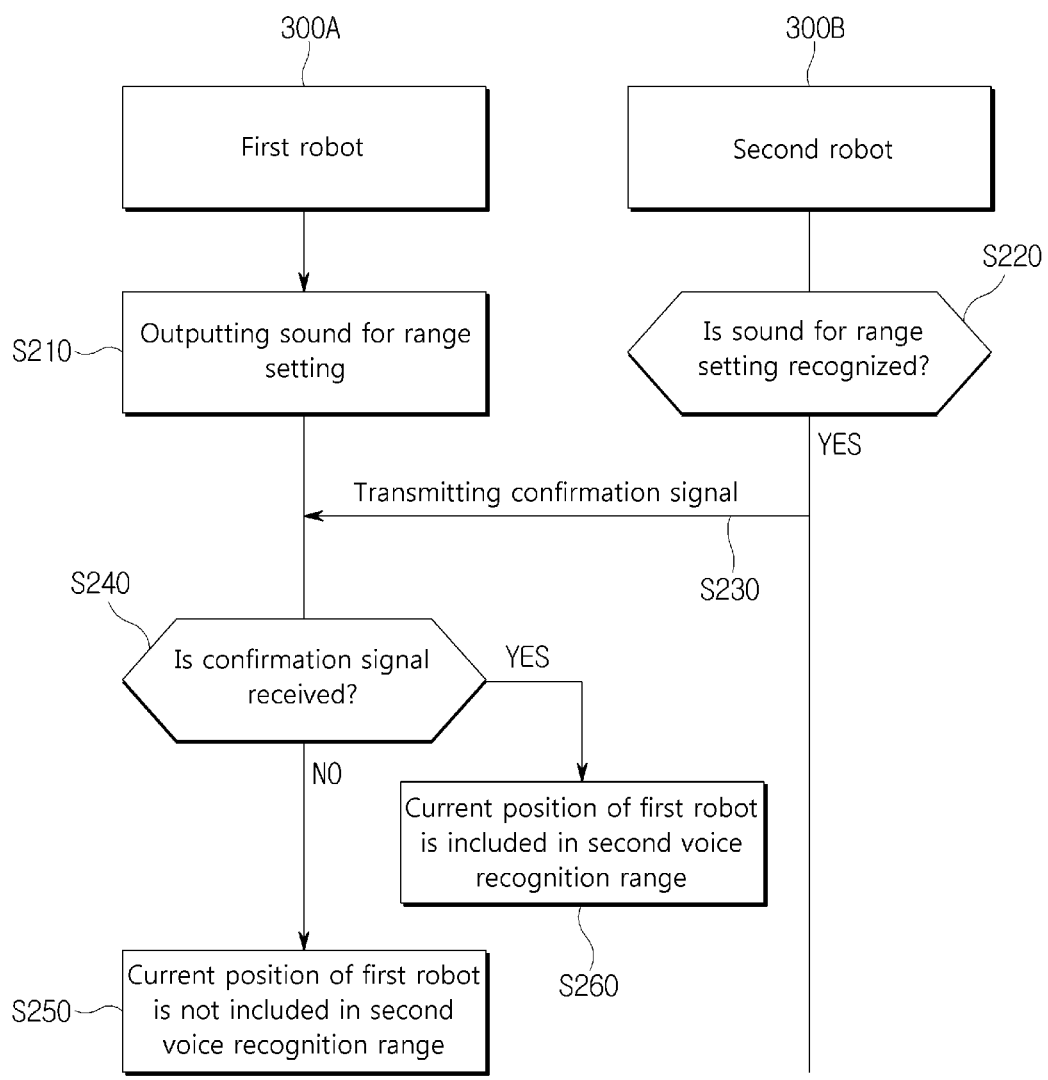
FIG. 11 is a flowchart showing a method of determining a voice recognition range of a robot according to embodiments of the present disclosure.

FIG. 11 is a flowchart showing a method of determining a voice recognition range of a robot according to embodiments of the present disclosure. The method shown in FIG. 11 may be performed by the processor 360 of the robot 300. In addition, the method may be implemented by instructions executable by the processor 360. The instructions may be stored in a computer readable storage medium in a program form. Referring to FIGS. 1 to 11, the first robot 300A may determine the second voice recognition range VC2 of the second robot 300B.

The first robot 300A may output a sound for range setting at step S210. According to embodiments, the first robot 300A may output the sound for range setting by using the voice input-output device. For example, the first robot 300A may output sound in a frequency band that a human is unable to recognize (for example, sound in a frequency band of 40000 Hz or more).

The first robot 300A may output the sound for range setting in response to a request of the second robot 300B. According to embodiments, the second robot 300B may detect a change in the surrounding environment. According to a result of the detection, in the case where the change in the surrounding environment is equal to or exceeds a reference value, the second robot 300B may transmit a request for range determination to the first robot 300A. For example, in the case where the second robot 300B detects a new object, where a detected object is no longer detected, or where a change in the average amplitude of sound exceeds a preset degree, the second robot 300B may transmit the request for range determination to the first robot 300A.

The second robot 300B may determine whether the sound for range setting output from the first robot 300A is recognized, at step S220. According to embodiments, the second robot 300B determines that the output sound for range setting is recognized, when a distorted sound waveform is measured through the microphone. For example, the second robot 300B may measure the surrounding sound by using the microphone, and may monitor the waveform corresponding to the measured sound. According to a result of the monitoring, when there is a noise or aliasing is present in the measured waveform, the second robot 300B determines whether the sound for range setting is recognized, at step S220.

The sound for range setting may have a different frequency band than the sound present in the background. Accordingly, when the second robot 300B is positioned within a range in which the sound for range setting is recognized, the waveform corresponding to the sound measured by the second robot 300B is changed, and through this, the second robot 300B determines that the sound for range setting is recognized.

According to embodiments, the sound for range setting may have the frequency band that is inaudible to a human. For example, the sound for range setting may be sound of 4000 Hz or more.

When the sound for range setting is recognized at step S220—YES, the second robot 300B transmits a confirmation signal to the first robot 300A at step S230. According to embodiments, the second robot 300B may transmit the confirmation signal to the first robot 300A over the wireless network by using the communication circuit.

The first robot 300A may determine the second voice recognition range VC2 on the basis of the confirmation signal transmitted from the second robot 300B and the current position of the first robot 300A.

When the first robot 300A receives the confirmation signal from the second robot 300B at step S240—YES, it is determined that the current position of the first robot 300A is included in the second voice recognition range VC2, at step S260. According to embodiments, when the first robot 300A receives the confirmation signal from the second robot 300B, the first robot 300A includes the current position of the first robot 300A in the second voice recognition range VC2. That is, the first robot 300A may determine the second voice recognition range VC2 that includes the current position of the first robot 300A.

According to embodiments, when the first robot 300A receives the confirmation signal from the second robot 300B at step S240—YES, the first robot 300A store the current position of the first robot 300A in the memory as the second voice recognition range VC2. Further, according to embodiments, when the first robot 300A receives the confirmation signal from the second robot 300B at step S240—YES, the first robot 300A determines that the current position of the first robot 300A belongs in the second voice recognition range VC2, and moves to another position.

When the first robot 300A does not receive the confirmation signal from the second robot 300B at step S240—NO, the first robot 300A determines that the current position of the first robot 300A is not included in the second voice recognition range VC2, at step S250. According to embodiments, when the first robot 300A does not receive the confirmation signal from the second robot 300B, the first robot 300A does not include the current position of the first robot 300A in the second voice recognition range VC2.

According to embodiments, when the first robot 300A does not receive the confirmation signal from the second robot 300B at step S240—NO, the first robot 300A determined that the current position of the first robot 300A does not belong in the second voice recognition range VC2, and waits at the current position.

When the first robot 300A does not receive the confirmation signal within a first reference time, starting from the point in time when the sound for range setting is output, it is determined that the confirmation signal is not received. According to embodiments, when the first robot 300A does not receive the confirmation signal within the first reference time, starting from the point in time when the sound for range setting is output, the first robot 300A outputs the sound for range setting once more. Afterward, when the confirmation signal is not received within a second reference time, starting from the point in time when the sound for range setting is output again, it is determined that the confirmation signal is not received.

The first robot 300A according to embodiments of the present disclosure may determine the second voice recognition range VC2 of the second robot 300B by using the sound for range setting. In addition, the first robot 300A may determine whether the current position of the first robot 300A belongs in the second voice recognition range VC2 of the second robot 300B. According to embodiments, information on the second voice recognition range VC2 of the second robot 300B determined by the first robot 300A may be stored in the first robot 300A.

Figure 12:
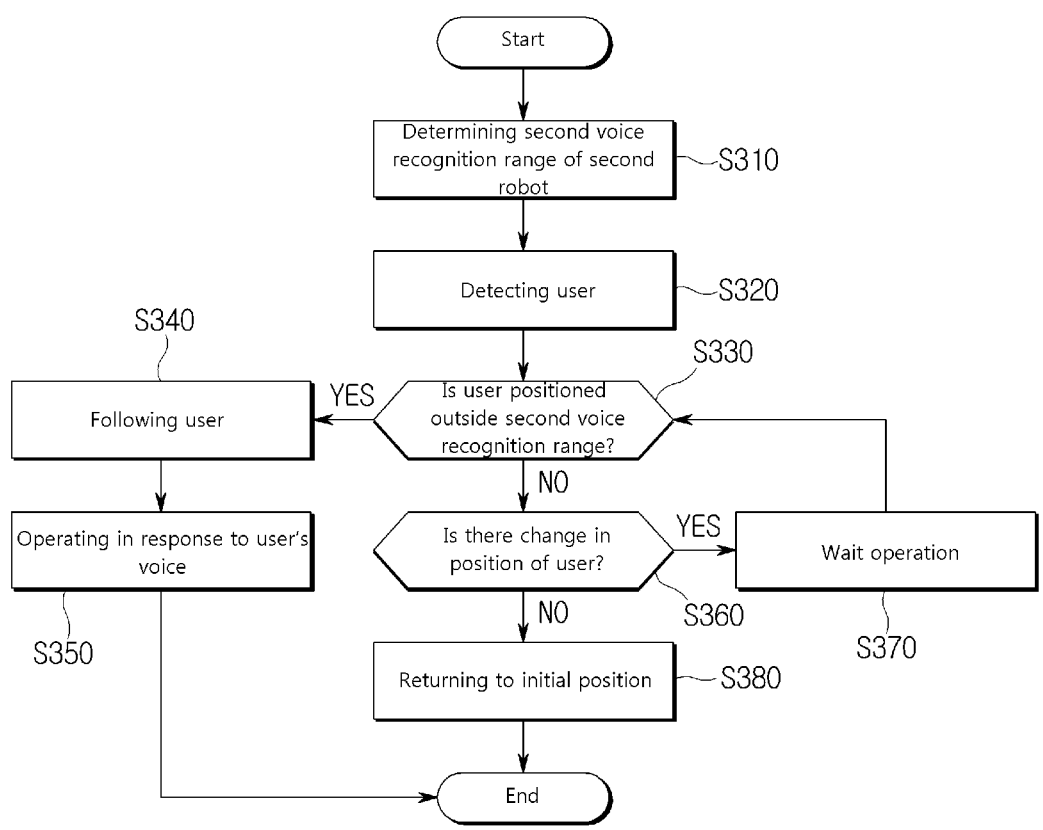
FIG. 12 is a flowchart showing an operation of a robot according to embodiments of the present disclosure.

FIG. 12 is a flowchart showing an operation of a robot according to embodiments of the present disclosure. The method shown in FIG. 12 may be performed by the processor 360 of the robot 300. In addition, the method may be implemented by instructions executable by the processor 360.

Referring to FIGS. 1 to 12, steps S310 to S350 are the same as steps S110 to S150 described with reference to FIG. 6, respectively, and thus a description thereof will be omitted.

When the user USER is not positioned outside the second voice recognition range VC2 at step S330—NO, the first robot 300A determines whether there is a change in the position of the user USER, at step S360. According to embodiments, in the case where the user USER is positioned within the second voice recognition range VC2, the first robot 300A determines that there is no change in the position, by using the sensor, when the change in the position of the user USER is equal to or less than a reference value; and the first robot 300A determines that there is a change in the position, when the change exceeds the reference value. For example, the first robot 300A may determine whether there is a change in the position of the user USER at a predetermined time.

When there is a change in the position of the user USER at step S360—YES, the first robot 300A performs a wait operation at step S370. According to embodiments, the first robot 300A may approach the second voice recognition range VC2 and may wait near the second voice recognition range VC2. When there is a change in the position of the user USER, the user USER is likely to move out of the second voice recognition range VC2.

According to embodiments, the first robot 300A may continuously monitor the position of the user USER during the wait operation, and may determine whether the user USER is positioned outside the second voice recognition range VC2. When there is no change in the position of the user USER at step S360—NO, the first robot 300A returns to the initial position at step S380. The initial position may be a position before the first robot 300A detects the user USER (for example, before step S320), a position for charging the first robot 300A, or a pre-defined position. According to embodiments, when there is no change in the position of the user USER at step S370-NO, the first robot 300A performs the fundamental operation.

According to embodiments of the present disclosure, the first robot 300A may determine the voice recognition range of the second robot 300B, and may operate according to the determined voice recognition range. The first robot 300A may perform different operations depending on whether the user USER is positioned outside the determined voice recognition range. For example, the first robot 300A may operate in response to the user USER's voice, the user being positioned outside the voice recognition range.

Therefore, even though the user USER is positioned outside the second voice recognition range VC2 of the second robot 300B, the first robot 300A performs an operation in response to the user USER's voice.

The control method of the robot or operation method of the processor according to embodiments of the present disclosure may be stored in a computer readable storage medium so as to be employed in commands executable by the processor.

The storage medium can include a database, including distributed database, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Although some embodiments have been disclosed above, it should be understood that these embodiments are given by way of illustration only, and that various modifications, variations, and alterations can be made without departing from the spirit and scope of the present disclosure. Therefore, the scope of the present disclosure should be limited only by the accompanying claims and equivalents thereof.

Accordingly, the present disclosure has been made keeping in mind the above problems occurring in the related art, and the present disclosure is intended to provide a first robot and a second robot, wherein the first robot determines a voice recognition range of the second robot that operates according to a user's voice, and follows the user who is positioned outside the determined voice recognition range of the second robot.

In addition, the present disclosure is intended to provide a first robot and a second robot, wherein the first robot determines a voice recognition range of the second robot and operates in response to a user's voice, the user being positioned outside the determined voice recognition range of the second robot.

According to embodiments of the present disclosure, a first robot includes: a communication circuit configured to transmit and receive a signal; a sensor configured to detect a surrounding environment; a driving device configured to implement movement of the first robot; and a processor configured to control the first robot, wherein the processor determines a second voice recognition range of a second robot on the basis of a confirmation signal transmitted from the second robot, and when a user is positioned outside the determined second voice recognition range, the processor controls the driving device so that the first robot follows the user.

According to embodiments of the present disclosure, a robot system includes: a fixed type robot configured to operate according to a user voice of the user; and a movable type robot configured to be movable and to operate according to the user voice, wherein the movable type robot determines a second voice recognition range of the fixed type robot on the basis of a confirmation signal transmitted from the fixed type robot, and when the user is positioned outside the determined second voice recognition range, the movable type robot follows the user.

According to embodiments of the present disclosure, a method of operating a first robot that communicates with a second robot, the method including: receiving a confirmation signal from the second robot; determining a second voice recognition range of the second robot on the basis of the confirmation signal; determining whether a user is positioned outside the second voice recognition range; and following the user when the user is positioned outside the second voice recognition range.

According to embodiments of the present disclosure, the first robot and the second robot may perform operations according to the user's voice.

According to embodiments of the present disclosure, the first robot may determine the voice recognition range of the second robot and may follow the user who is positioned outside the determined voice recognition range of the second robot.

According to embodiments of the present disclosure, the first robot may determine the voice recognition range of the second robot and may operate in response to the user's voice, the user being positioned outside the determined voice recognition range of the second robot.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A first robot to communicate with a second robot that includes at least a second communication device and a second voice input-output device, the first robot comprising:
   a memory;
   a processor configured to control the first robot;
   a first communication device configured to transmit and receive wireless signals;
   a first voice input-output device configured to receive a voice and to output a voice;
   a sensor configured to detect a surrounding environment, and to provide detection data based on the detected environment to the processor; and
   a driving device configured to provide a driving force to move the first robot,
   wherein the processor is configured to:
      identify a user based on an appearance of an object in the detection data and data for identifying the user stored in the memory,
      determine a position of the user based on the detection data and map data stored in the memory,
      determine a second voice recognition range of the second robot based on whether or not a confirmation signal is received from the second robot after transmitting a sound for range setting,
      determine whether a user is positioned outside the determined second voice recognition range of the second robot based on the determined position of the user and the determined second voice recognition range, and
      when the user is determined to be positioned outside the determined second voice recognition range of the second robot, the processor controls the driving device such that the first robot is to move with respect to the user.

2. The first robot of claim 1, wherein when the confirmation signal is received at the first robot, the processor is to determine that a current position of the first robot is included in the second voice recognition range, and
   when the confirmation signal is not received at the first robot, the processor is to determine that the current position of the first robot is not included in the second voice recognition range.

3. The first robot of claim 1,
   wherein in response to receiving a user voice through the first voice input-output device, the processor is to control the first robot to perform an operation based on the received user voice.

4. The first robot of claim 3, wherein when the user is determined to not be positioned outside the second voice recognition range of the second robot, the processor does not process the received user voice.

5. The first robot of claim 1, wherein the processor is configured to:
   control the driving device to move the first robot such that the user is positioned within a first voice recognition range of the first robot in which the first robot is capable of recognizing the voice through the first voice input-output device.

6. The first robot of claim 5, wherein when the user is determined to not be positioned outside the second voice recognition range of the second robot and there is no change in the position of the user, the processor is to control the driving device to move the first robot to a first position.

7. The first robot of claim 5, wherein when the user is determined to not be positioned outside the second voice recognition range of the second robot and there is a change in the position of the user, the processor is to control the driving device to move the first robot to approach the second voice recognition range of the second robot.

8. The first robot of claim 1, wherein when the user is determined to be positioned outside the second voice recognition range of the second robot and a user voice of the user received through the first voice input-output device contains an activation word for the second robot, the processor is to control the first communication device to transmit, to the second robot, an operation command corresponding to the user voice.

9. The first robot of claim 1, wherein when the user is determined to be positioned outside the second voice recognition range of the second robot and a user voice of the user received through the first voice input-output device contains an activation word for the second robot, the processor is to perform an operation corresponding to the user voice.

10. The first robot of claim 1, wherein the processor is configured to control the first robot to provide the second robot with a signal indicating that the user is positioned outside the second voice recognition range of the second robot.

11. A robot system comprising:
a fixed type robot configured to operate based on a user voice of a user the fixed type robot comprising:
  a second processor configured to control the fixed type robot,
  a second communication device configured to transmit and receive wireless signals, and
  a second voice input-output device configured to receive a voice and to output a voice; and
a movable type robot configured to be movable and to operate based on the user voice, the movable type robot comprising:
  a memory,
  a first processor configured to control the movable type robot,
  a first communication device configured to transmit and receive wireless signals,
  a first voice input-output device configured to receive a voice and to output a voice,
  a sensor configured to detect a surrounding environment, and to provide detection data based on the detected environment to the first processor, and
  a driving device configured to provide a driving force to move the movable type robot,
wherein the movable type robot is configured to:
  identify a user based on an appearance of an object in the detection data and data for identifying the user stored in the memory,
  determine a position of the user based on the detection data and map data stored in the memory,
  determine a second voice recognition range of the fixed type robot based on whether or not a confirmation signal is received from the fixed type robot after transmitting a sound for range setting,
  determine whether a user is positioned outside the determined second voice recognition range of the fixed type robot based on the determined position of the user and the determined second voice recognition range, and
  when the user is determined to be positioned outside the determined second voice recognition range of the fixed type robot, the first processor controls the driving device such that the movable type robot is to move with respect to the user.

12. The robot system of claim 11, wherein the movable type robot is to output the sound for range setting through the first voice input-output device, and
when the fixed type robot recognizes the sound for range setting received through the second voice input-output device, the fixed type robot is to transmit the confirmation signal through the second communication device and to the movable type robot.

13. The robot system of claim 11, wherein the movable type robot is configured to move with respect to the user such that the user is positioned within a first voice recognition range of the movable type robot in which the movable type robot is capable of recognizing the user voice through the first voice input-output device.

14. The robot system of claim 11, wherein when the user is determined to not be positioned outside the second voice recognition range of the fixed type robot, the movable type robot is to not process the user voice.

15. The robot system of claim 11, wherein when the user is determined to be positioned outside the second voice recognition range of the fixed type robot and a user voice received through the first voice input-output device contains an activation word for the fixed type robot, the movable type robot is to transmit, to the fixed type robot, an operation command corresponding to the user voice.

16. The robot system of claim 11, wherein when the user is determined to be positioned outside the second voice recognition range of the fixed type robot and a user voice received through the first voice input-output device contains an activation word for the fixed type robot, the movable type robot is to perform an operation corresponding to the user voice.

17. A method of operating a first robot that is to communicate with a second robot, the method comprising:
identifying, at the first robot, a user based on an appearance of an object in detection data and data for identifying the user stored in a memory;
determining, at the first robot, a position of the user based on the detection data and map data stored in the memory;
transmitting, from the first robot and to the second robot, a sound for range setting;
determining, at the first robot, a second voice recognition range of the second robot based on whether or not a confirmation signal is received from the second robot;
determining, at the first robot, whether a user is positioned outside the determined second voice recognition range of the second robot based on the determined position of the user and the determined second voice recognition range; and
controlling the first robot to move with respect to the user when the user is determined to be positioned outside the second voice recognition range of the second robot.

18. The method of claim 17, wherein the controlling of the first robot with respect to the user comprises:
controlling the first robot to move with respect to the user such that the user is positioned within a first voice recognition range of the first robot in which the first robot is capable of recognizing a user voice through a voice input-output device.

19. The method of claim 17, further comprising:
transmitting, to the second robot, an operation command corresponding to a user voice, when the user is determined to be positioned outside the second voice recognition range of the second robot and the user voice of the user received through a voice input-output device contains an activation word for the second robot.

20. The method of claim 17, further comprising:

performing, at the first robot, an operation corresponding to a user voice that contains an activation word, when the user is determined to be positioned outside the second voice recognition range of the second robot and the user voice of the user received through a voice input-output device contains an activation word for the second robot.

\* \* \* \* \*